(12) United States Patent
Chang et al.

(10) Patent No.: US 7,783,643 B2
(45) Date of Patent: *Aug. 24, 2010

(54) DIRECT NAVIGATION FOR INFORMATION RETRIEVAL

(75) Inventors: Jane Wen Chang, Cambridge, MA (US); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/019,586

(22) Filed: Jan. 24, 2008

(65) Prior Publication Data
US 2008/0140613 A1  Jun. 12, 2008

Related U.S. Application Data

(63) Continuation of application No. 10/080,945, filed on Feb. 22, 2002, now Pat. No. 7,343,372.

(51) Int. Cl.
  *G06F 17/30* (2006.01)
(52) U.S. Cl. .................. 707/740; 707/780; 707/917
(58) Field of Classification Search .................. None
See application file for complete search history.

(56) References Cited

U.S. PATENT DOCUMENTS

| | | | |
|---|---|---|---|
| 4,586,160 A | 4/1986 | Amano et al. | |
| 4,724,523 A | 2/1988 | Kucera | |
| 4,984,178 A | 1/1991 | Hemphill et al. | |
| 5,023,832 A | 6/1991 | Fulcher et al. | |
| 5,060,155 A | 10/1991 | Van Zuijlen | |
| 5,111,398 A | 5/1992 | Nunberg et al. | |
| 5,146,406 A | 9/1992 | Jensen | |
| 5,251,129 A | 10/1993 | Jacobs | |
| 5,265,065 A * | 11/1993 | Turtle | 707/4 |
| 5,325,298 A | 6/1994 | Gallant | |
| 5,349,526 A | 9/1994 | Potts et al. | |
| 5,365,430 A | 11/1994 | Jagadish | |
| 5,369,577 A | 11/1994 | Kadashevich et al. | |
| 5,418,717 A | 5/1995 | Su et al. | |
| 5,418,948 A * | 5/1995 | Turtle | 707/4 |
| 5,475,588 A | 12/1995 | Schabes et al. | |
| 5,488,725 A * | 1/1996 | Turtle et al. | 707/5 |
| 5,506,787 A | 4/1996 | Muhlfeld et al. | |

(Continued)

FOREIGN PATENT DOCUMENTS

EP  0 304 191  2/1989

(Continued)

OTHER PUBLICATIONS

Business Wire "iPhrase Fundamentally Redefines Web Site Navigation and Search", Press Release, Jun. 19, 2000.*

(Continued)

*Primary Examiner*—Luke S Wassum
(74) *Attorney, Agent, or Firm*—Gates & Cooper LLP

(57) ABSTRACT

A method of document retrieval is provided. The method includes assigning concept labels to documents contained in a collection according to grammar rules, receiving a query, converting the query to a query concept using the grammar rules, and mapping the query concept to a concept label.

4 Claims, 3 Drawing Sheets

U.S. PATENT DOCUMENTS

| | | | | |
|---|---|---|---|---|
| 5,577,241 | A | 11/1996 | Spencer | |
| 5,590,055 | A | 12/1996 | Chapman et al. | |
| 5,594,641 | A | 1/1997 | Kaplan et al. | |
| 5,610,812 | A | 3/1997 | Schabes et al. | |
| 5,615,360 | A | 3/1997 | Bezek et al. | |
| 5,625,748 | A * | 4/1997 | McDonough et al. | 704/251 |
| 5,627,914 | A | 5/1997 | Pagallo | |
| 5,634,053 | A | 5/1997 | Noble et al. | |
| 5,634,121 | A | 5/1997 | Tracz et al. | |
| 5,649,215 | A | 7/1997 | Itoh | |
| 5,680,628 | A | 10/1997 | Carue | |
| 5,708,829 | A | 1/1998 | Kadashevich | |
| 5,721,897 | A * | 2/1998 | Rubinstein | 707/2 |
| 5,737,621 | A | 4/1998 | Kaplan et al. | |
| 5,737,734 | A | 4/1998 | Schultz | |
| 5,748,973 | A | 5/1998 | Palmer et al. | |
| 5,768,578 | A * | 6/1998 | Kirk et al. | 707/100 |
| 5,799,268 | A | 8/1998 | Boguraev | |
| 5,822,731 | A | 10/1998 | Schultz | |
| 5,826,076 | A | 10/1998 | Bradley et al. | |
| 5,864,863 | A | 1/1999 | Burrows | |
| 5,884,302 | A | 3/1999 | Ho | |
| 5,890,147 | A | 3/1999 | Peltonen et al. | |
| 5,913,215 | A | 6/1999 | Rubenstein et al. | |
| 5,933,822 | A * | 8/1999 | Braden-Harder et al. | 707/5 |
| 5,940,821 | A * | 8/1999 | Wical | 707/3 |
| 5,950,184 | A | 9/1999 | Karttunen | |
| 5,950,192 | A | 9/1999 | Moore et al. | |
| 5,956,711 | A | 9/1999 | Sullivan et al. | |
| 5,963,894 | A | 10/1999 | Richardson et al. | |
| 5,970,449 | A | 10/1999 | Alleva et al. | |
| 5,983,216 | A | 11/1999 | Kirsch | |
| 5,991,713 | A | 11/1999 | Unger et al. | |
| 5,991,751 | A | 11/1999 | Rivette et al. | |
| 5,991,756 | A | 11/1999 | Wu | |
| 6,006,221 | A | 12/1999 | Liddy et al. | |
| 6,009,422 | A | 12/1999 | Ciccarelli | |
| 6,012,053 | A | 1/2000 | Pant et al. | |
| 6,018,735 | A | 1/2000 | Hunter | |
| 6,025,843 | A | 2/2000 | Sklar | |
| 6,026,388 | A | 2/2000 | Liddy et al. | |
| 6,032,111 | A | 2/2000 | Mohri et al. | |
| 6,038,560 | A * | 3/2000 | Wical | 707/5 |
| 6,038,561 | A * | 3/2000 | Snyder et al. | 707/6 |
| 6,055,528 | A | 4/2000 | Evans | |
| 6,058,365 | A | 5/2000 | Nagal et al. | |
| 6,064,953 | A | 5/2000 | Maxwell, III et al. | |
| 6,064,977 | A | 5/2000 | Haverstock et al. | |
| 6,070,158 | A | 5/2000 | Kirsch et al. | |
| 6,073,098 | A | 6/2000 | Buchsbaum et al. | |
| 6,076,088 | A | 6/2000 | Paik et al. | |
| 6,081,774 | A | 6/2000 | de Hita et al. | |
| 6,094,652 | A | 7/2000 | Falsal | |
| 6,101,537 | A | 8/2000 | Edelstein et al. | |
| 6,138,128 | A | 10/2000 | Perkowitz et al. | |
| 6,154,720 | A | 11/2000 | Onishi | |
| 6,167,370 | A * | 12/2000 | Tsourikov et al. | 704/9 |
| 6,169,986 | B1 | 1/2001 | Bowman et al. | |
| 6,182,029 | B1 | 1/2001 | Friedman | |
| 6,182,063 | B1 | 1/2001 | Woods | |
| 6,182,065 | B1 | 1/2001 | Yeomans | |
| 6,233,575 | B1 | 5/2001 | Agrawal et al. | |
| 6,233,578 | B1 | 5/2001 | Machihara et al. | |
| 6,236,987 | B1 * | 5/2001 | Horowitz et al. | 707/3 |
| 6,243,679 | B1 | 6/2001 | Mohri et al. | |
| 6,256,631 | B1 | 7/2001 | Malcolm | |
| 6,263,335 | B1 | 7/2001 | Paik et al. | |
| 6,269,368 | B1 | 7/2001 | Diamond | |
| 6,271,840 | B1 | 8/2001 | Finseth et al. | |
| 6,275,819 | B1 | 8/2001 | Carter | |
| 6,278,973 | B1 | 8/2001 | Chung et al. | |
| 6,292,794 | B1 | 9/2001 | Cecchini et al. | |
| 6,292,938 | B1 | 9/2001 | Sarkar et al. | |
| 6,298,324 | B1 | 10/2001 | Zuberec et al. | |
| 6,304,864 | B1 | 10/2001 | Liddy et al. | |
| 6,304,872 | B1 | 10/2001 | Chao | |
| 6,311,194 | B1 | 10/2001 | Sheth et al. | |
| 6,314,439 | B1 | 11/2001 | Bates et al. | |
| 6,324,534 | B1 | 11/2001 | Neal et al. | |
| 6,349,295 | B1 | 2/2002 | Tedesco et al. | |
| 6,353,827 | B1 | 3/2002 | Davies et al. | |
| 6,363,373 | B1 * | 3/2002 | Steinkraus | 707/3 |
| 6,363,377 | B1 | 3/2002 | Kravets et al. | |
| 6,366,910 | B1 | 4/2002 | Rajaraman et al. | |
| 6,377,945 | B1 | 4/2002 | Rievik | |
| 6,393,415 | B1 | 5/2002 | Getchius et al. | |
| 6,397,209 | B1 | 5/2002 | Reed et al. | |
| 6,397,212 | B1 | 5/2002 | Biffar | |
| 6,401,084 | B1 | 6/2002 | Ortega et al. | |
| 6,415,250 | B1 | 7/2002 | van den Akker | |
| 6,434,554 | B1 | 8/2002 | Asami et al. | |
| 6,434,556 | B1 | 8/2002 | Levin et al. | |
| 6,438,540 | B2 | 8/2002 | Nasr et al. | |
| 6,438,575 | B1 | 8/2002 | Khan et al. | |
| 6,446,061 | B1 | 9/2002 | Doerre et al. | |
| 6,446,256 | B1 | 9/2002 | Hyman et al. | |
| 6,449,589 | B1 | 9/2002 | Moore | |
| 6,463,533 | B1 | 10/2002 | Calamera et al. | |
| 6,466,940 | B1 * | 10/2002 | Mills | 707/102 |
| 6,480,843 | B2 | 11/2002 | Li | |
| 6,505,158 | B1 | 1/2003 | Conkie | |
| 6,542,889 | B1 * | 4/2003 | Aggarwal et al. | 707/5 |
| 6,560,590 | B1 | 5/2003 | Shwe et al. | |
| 6,584,464 | B1 | 6/2003 | Warthen | |
| 6,601,026 | B2 * | 7/2003 | Appelt et al. | 704/9 |
| 6,611,825 | B1 | 8/2003 | Billheimer et al. | |
| 6,651,220 | B1 | 11/2003 | Penteroudakis et al. | |
| 6,665,662 | B1 * | 12/2003 | Kirkwood et al. | 707/3 |
| 6,675,159 | B1 * | 1/2004 | Lin et al. | 707/3 |
| 6,704,728 | B1 * | 3/2004 | Chang et al. | 707/5 |
| 6,711,561 | B1 * | 3/2004 | Chang et al. | 707/3 |
| 6,714,905 | B1 * | 3/2004 | Chang et al. | 704/9 |
| 6,745,181 | B1 * | 6/2004 | Chang et al. | 707/4 |
| 6,766,320 | B1 * | 7/2004 | Wang et al. | 707/5 |
| 6,785,671 | B1 | 8/2004 | Bailey et al. | |
| 6,862,710 | B1 | 3/2005 | Marchisio | |
| 7,047,242 | B1 | 5/2006 | Ponte | |
| 7,136,846 | B2 * | 11/2006 | Chang et al. | 707/3 |
| 7,343,372 | B2 * | 3/2008 | Chang et al. | 707/5 |
| 2002/0059161 | A1 | 5/2002 | Li | |
| 2003/0037043 | A1 * | 2/2003 | Chang et al. | 707/3 |
| 2004/0133603 | A1 * | 7/2004 | Chang et al. | 707/104.1 |
| 2004/0167889 | A1 * | 8/2004 | Chang et al. | 707/3 |
| 2006/0123045 | A1 * | 6/2006 | Chang et al. | 707/102 |

FOREIGN PATENT DOCUMENTS

EP        0 597 630        5/1994

OTHER PUBLICATIONS

Charski, M. "Search Technology Gets Smart", Inter@ctive Week, Jul. 24, 2000.*

Basso, P. "iPhrase Eases Financial Searches", Wall Street & Technology, Aug. 9, 2000.*

Windows User News "Plain English Search Engine on schwab.com", vol. 10, No. 8, p. 4, Aug. 2000.*

Moskowitz, L. and T. Claburn "The Searchers", Smart Business, Jan. 2001.*

Business Wire "iPhrase Technologies Announces Availability of Industry's First One Step Information Access Platform", Press Release, Mar. 7, 2001.*

Quint, B. "LexisNexis Applies iPhrase Natural Language Search Software to Key Directory Files", Information Today, vol. 18, No. 11, p. 46, Dec. 2001.*

Lohman, G., "Grammar-like Functional Rules for Representing Query Optimization Alternative," Proceedings of the 1988 ACM SIGMOD International Conference on Management Data, 1988, pp. 18-27.

Moore, J. et al., "Web Page Categorization and Feature Selection Using Association Rule and Principal Component Clustering," Proceedings of the 7$^{th}$ Workshop on Information Technologies and Systems, Dec. 1997.

Mase, "Experiments on Automatic Web Page Categorization for IR Systems," Technical Report, Stanford University, 1998.

Berners-Lee, et al., "The Semantic Web," Scientific American.com, May 17, 2001.

Brasethvik, et al., "A Conceptual Modeling Approach to Semantic Document Retrieval," Proceedings of the 14$^{th}$ International Conference on Advanced Information Systems Engineering, May 27-31, 2002.

Khan, et al., "Personal Adaptive Web Agent: A Tool for Information Filtering," Canadian Conference on Electrical Computer Engineering, vol. 1, May 25, 1997, pp. 305-308.

Davies, et al., "Knowledge Discovery and Delivery," British Telecommunications Engineering, London, GB, vol. 17, No. 1, Apr. 1, 1998, pp. 25-35.

Persin, "Document Filtering for Fast Ranking," Sigir 94, Dublin, Jul. 3-6, 1994, Proceedings of the Annual International ACM-Sigir Conference on Research and Development in Information Retrieval, Berlin, Springer, DE, vol. CONF. 17, Jul. 3, 1994, pp. 339-348.

Han et al., "WebACE: A Web Agent for Document Categorization and Exploration," Proceedings of the 2$^{nd}$ International Conference on Autonomous Agents Minneapolis/St. Paul, MN, May 9-13, 1999, Proceedings of the International Conference on Autonomous Agents, New York NY, May 9, 1998, pp. 408-415.

Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.

allwords.com "definition of the term 'concept'," downloaded from www.allwords.com on Feb. 8, 2006.

allwords.com "definition of the term theme," downloaded from www.allwords.com on Feb. 8, 2006.

* cited by examiner

DIRECT NAVIGATION FOR INFORMATION RETRIEVAL

CROSS-REFERENCE TO RELATED APPLICATION

This application is a continuation of application Ser. No. 10/080,945, filed on Feb. 22, 2002, by Jane W. Chang et al., entitled DIRECT NAVIGATION FOR INFORMATION RETRIEVAL.

BACKGROUND

This invention relates to direct navigation for information retrieval.

A web page such as on the World Wide Web ("Web") represents web content and is typically written in Hypertext Markup Language ("HTML"). HTML is a set of markup symbols or codes inserted in a file intended for display on a Web browser page. The markup symbols tell the Web browser how to display a Web page's words and images for a user.

A search engine is Web-enabled software that receives search terms, i.e., a query, from a user and identifies documents, i.e., web pages, on the Web that are otherwise associated with, the search terms. The documents are typically identified by uniform resource locators ("URLs") that are links to their content.

SUMMARY

In an aspect, the invention features a method of retrieving information including assigning concept labels to documents contained in a collection, receiving a query, converting the query to a query concept, and mapping the query concept to a concept label.

Embodiments may include one or more of the following. Assigning may include parsing the documents automatically with a grammar. The concept label may represent a general notion. The query may be a text query received from a user. Assigning may include spidering the collection, matching features contained in each of the documents to a store of concepts, and storing document location indicators for each matched concept. The documents may be HyperText Markup Language (HTML) files. The document location indicators may be Universal Resource Identifiers (URLs). Converting may include applying a store of grammar rules to the query and the grammar rules may map text to concepts.

The method may also include generating a list of the mapping in which the list represents locations of documents. The locations may be Universal Resource Identifiers (URLs).

In another aspect, the invention features a method of document retrieval including assigning concept labels to documents contained in a collection according to grammar rules, receiving a query, converting the query to a query concept using the grammar rules, and mapping the query concept to a concept label.

Embodiments may include one or more of the following. Assigning may include parsing the documents automatically with the grammar rules. The query may be received from a user.

The method may also include generating a list of the mapped query concepts, and displaying the list to the user on an input/output device.

Embodiments of the invention may have one or more of the following advantages.

Documents in a collection are pre-labeled with concepts, wherein each concept is a general notion or idea. A grammar is written around concepts. The grammar is applied to a user query and provides a direct mapping of the user query to appropriate documents in a collection of documents found on the Web.

The pre-labeling with concepts may be automatic using parsing with a grammar.

A user query is responded to using concept matching rather than direct word matching.

Using a grammar applied to a user query provides a technique for allowing many different ways of expressing something to map to a single item.

Annotating documents contained on the Web with concepts provides a robust manner of searching for Web documents.

Concept matching overcomes the limitation where a user query needs to match words and cannot find all the words in a single document.

DESCRIPTION OF DRAWINGS

The foregoing features and other aspects of the invention will be described further in detail by the accompanying drawings, in which.

DETAILED DESCRIPTION

Figure 1:
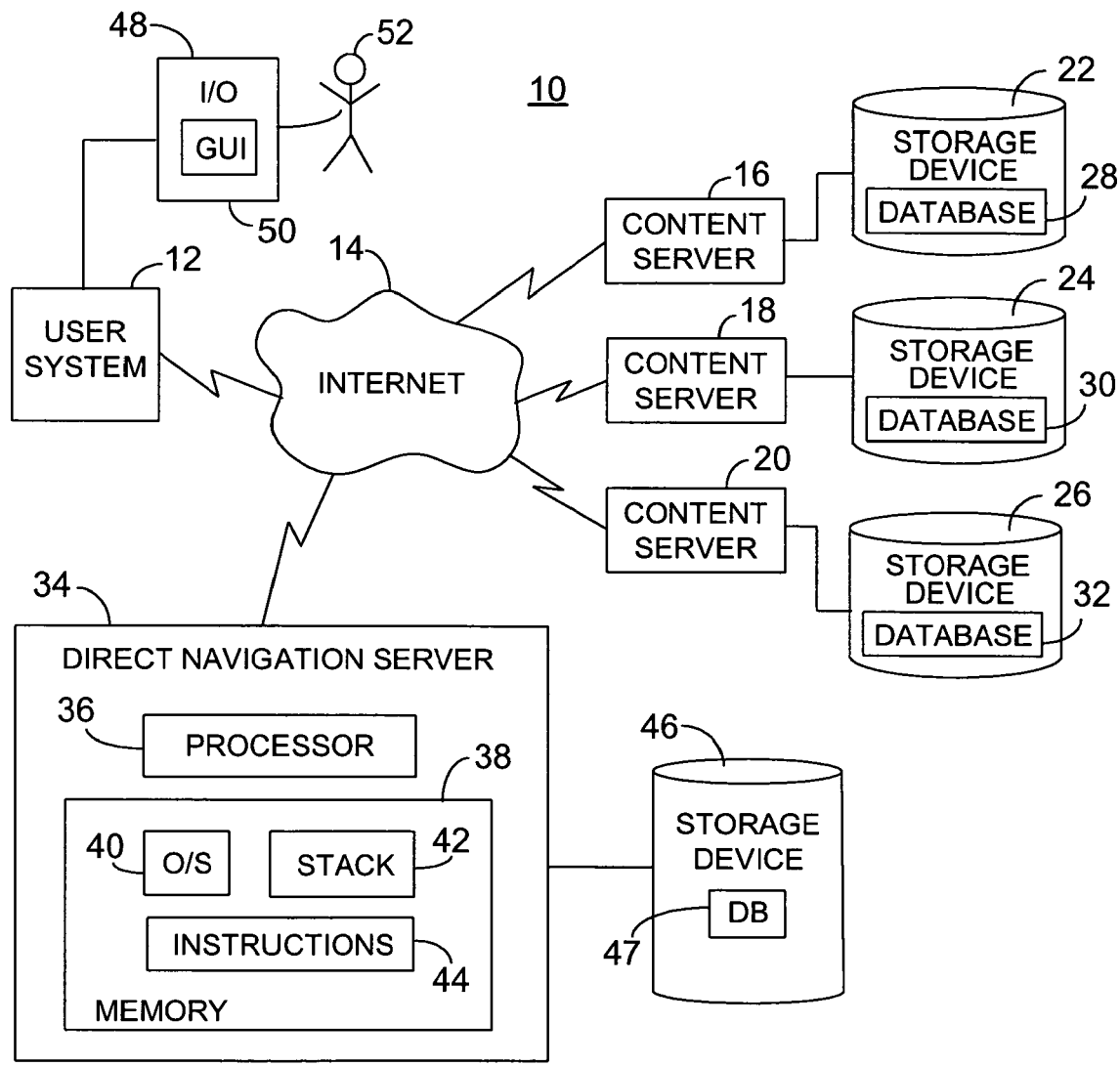
FIG. 1 is a block diagram of a network.

Referring to FIG. 1, an exemplary network 10 includes a user system 12 linked to a globally connected network of computers such as the Internet 14. The network 10 includes content servers 16, 18 and 20 linked to the Internet 14. Although only one user system 12 and three content server systems 16, 18, 20 are shown, other configurations include numerous client systems and numerous server systems. Each content server system 16, 18, 20 includes a corresponding storage device 22, 24, 26. Each storage device 22, 24, 26 includes a corresponding database of content 28, 30, 32. The network 10 also includes a direct navigation server 34.

The direct navigation server 34 includes a processor 36 and a memory 38. Memory 38 stores an operating system ("O/S") 40, a TCP/IP stack 42 for communicating over the network 10, and machine-executable instructions 44 executed by processor 36 to perform a direct navigation process 100 described below. The direct navigation server 34 also includes a storage device 46 having a database 47.

The user system 12 includes an input/output device 48 having a Graphical User Interface (GUI) 50 for display to a user 52. The GUI 50 typically executes search engine software such as the Yahoo, AltaVista, Lycos or Goggle search engine through browser software, such as Netscape Communicator from AOL Corporation or Internet Explorer from Microsoft Corporation.

Figure 2:
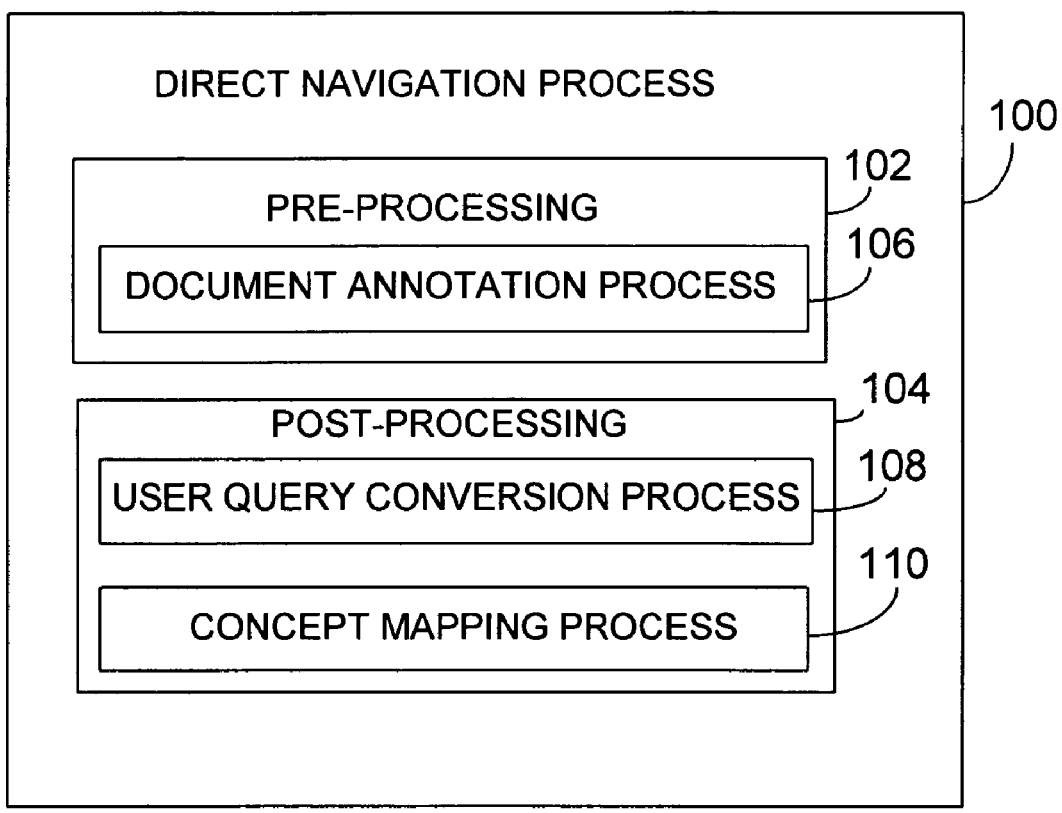
FIG. 2 is a block diagram of a direct navigation process.

Referring to FIG. 2, the direct navigation process 100 includes a pre-processing stage 102 and a post-processing stage 104. The pre-processing stage 102 includes a document annotation process 106. The post-processing stage 104 includes a user query conversion process 108 and a concept mapping process 110.

The annotation process 106 assigns one or more concept labels on features of a document contained in a collection of documents. A concept label represents a concept and a concept represents a general notion or idea, More specifically, each of the databases 28, 30, 32 contain pages (e.g., web pages) generally referred to as documents. The annotation process 106 includes a spider program to spider all the pages of content contained in the databases 28, 30, 32.

A spider is a program that visits Web sites (e.g., server 16, 18, 20) and reads their pages and other information in order to generate entries for a search engine index. The major search engines on the Web all have such a program, which is also known as a "crawler" or a "bot." Spiders are typically programmed to visit servers (i.e., websites) that have been submitted by their owners as new or updated. Entire Web sites or specific pages can be selectively visited and indexed. Spiders are called spiders because they usually visit many Web sites in parallel at the same time, their "legs" spanning a large area of the "web." Spiders can crawl through a site's pages in several ways. One way is to follow all the hypertext links in each page until all the pages have been read. Hypertext is an organization of information units into connected associations that a user can choose to make. An instance of such an association is called a link or hypertext link. A link is a selectable connection from one word, picture, or information object to another. In a multimedia environment such as the World Wide Web, such objects can include sound and motion video sequences. The most common form of link is the highlighted word or picture that can be selected by the user (with a mouse or in some other fashion), resulting in the immediate delivery and view of another file. The highlighted object is referred to as an anchor. The anchor reference and the object referred to constitute a hypertext link.

For example, a particular page of content may include text pertaining to automobiles, with their associated purchase options and pricing. This particular page can be annotated with a "review" concept and/or an "automotive review" concept. The document annotation process 106 stores a Universal Resource Identifier (URL) of the particular page along with its related concept(s) in the storage device 46 of the direct navigation server 34. The URL is an address of the particular page (also referred to as a resource). The type of resource depends on the Internet application protocol. Using the World Wide Web's protocol, the Hypertext Transfer Protocol (HTTP), the resource can be an HTML page, an image file, a program such as a common gateway interface application or Java applet, or any other file supported by HTTP. The URL has the name of the protocol required to access the resource, a domain name that identifies a specific computer on the Internet, and a hierarchical description of a page location on the computer.

Concepts can be generated manually and matched to the particular web page. Concepts can also be generated automatically by parsing the documents with a grammar. In another example, concepts can be generated from a review of features associated with the page being spidered.

In the post-processing stage 104, the user query conversion process 108 receives text in a user query entered by the user 52 through search engine software executing through browser software. In another example, the process 108 receives audio input as the user query and converts the audio input into a text user query.

The user query conversion process 108 utilizes a set of grammar rules stored in the storage device 46 of the direct navigation server 32 and applies the grammar rules to the user query such that the query matches one or more concepts.

The user query may be a word or multiple words, sentence fragments, a complete sentence, and may contain punctuation. The query is normalized as pretext. Normalization includes checking the text for spelling and proper separation. A language lexicon is also consulted during normalization. The language lexicon specifies a large list of words along with their normalized forms. The normalized forms typically include word stems only, that is, the suffixes are removed from the words. For example, the word "computers" would have the normalized form "computer" with the plural suffix removed.

The normalized text is parsed, converting the normalized text into fragments adapted for further processing. Annotating words as punitive keys and values, according to a feature lexicon, produces fragments. The feature lexicon is a vocabulary, or book containing an alphabetical arrangement of the words in a language or of a considerable number of them, with the definition of each e.g., a dictionary. For example, the feature lexicon may specify that the term "Compaq" is a potential value and that "CPU speed" is a potential key. Multiple annotations are possible.

The fragments are inflated by the context in which the text inputted by the user arrived, e.g., a previous query, if any, that was inputted and/or a content of a web page in which the user text was entered. The inflation is performed by selectively merging state information provided by a session if service with a meaning representation for the current query. The selective merging is configurable based on rules that specify which pieces of state information from the session service should be merged into the current meaning representation and which pieces should be overridden or masked by the current meaning representation.

A session service may store all of the "conversations" that occur at any given moment during all of the user's session. State information is stored in the session service providing a method of balancing load with additional computer configurations. Load balancing may send each user query to a different configuration of the computer system. However, since query processing requires state information, storage of station information on the computer system will not be compatible with load balancing. Hence, use of the session service provides easy expansion by the addition of server systems, with load sharing among the systems to support more users.

The state information includes user-specified constraints that were used in a previous query, if any. The state information may optionally include a result set, either in its entirety or in condensed form, from the previous query to speed up subsequent processing in context. The session service may reside in one computer system, or include multiple computer systems. When multiple computer systems are employed, the state information may be assigned to a single computer system or replicated across more than one computer system.

The inflated sentence fragments are converted into meaning representation by making multiple passes through a meaning resolution stage. The meaning resolution stage determines if there is a valid interpretation within the text query of a key-value grouping of the fragment. If there is a valid interpretation, the key value grouping is used. For example, if the input text, i.e., inflated sentence fragment, contains the string "500 MHz CPU speed," which may be parsed into two fragments, "500 MHz" value and "CPU speed" key, then there is a valid grouping of key="CPU speed" and value="500 MHz".

If no valid interpretation exists, a determination is made on whether the grammar rules contain a valid interpretation. If there is a valid interpretation, the key value group is used. If no valid interpretation is found, a determination of whether previous index fields have a high confidence of uniquely containing the fragment. If so, the key value grouping is used. If not, other information sources are searched and a valid key value group generated. If a high confidence and valid punitive key is determined through one of the information sources consulted, then the grouping of the key and value form an atomic element are used. To make it possible to override false interpretations, a configuration of grammar can also specify manual groupings of keys and values that take precedence over the meaning resolution stage. Meaning resolved fragments, representing the user query, are associated with concepts.

The concept mapping process 110 matches the concept associated resolved fragments to concept/URL pairs stored in the storage device 46 and loads the associated URL representing the matched concepts.

Figure 3:
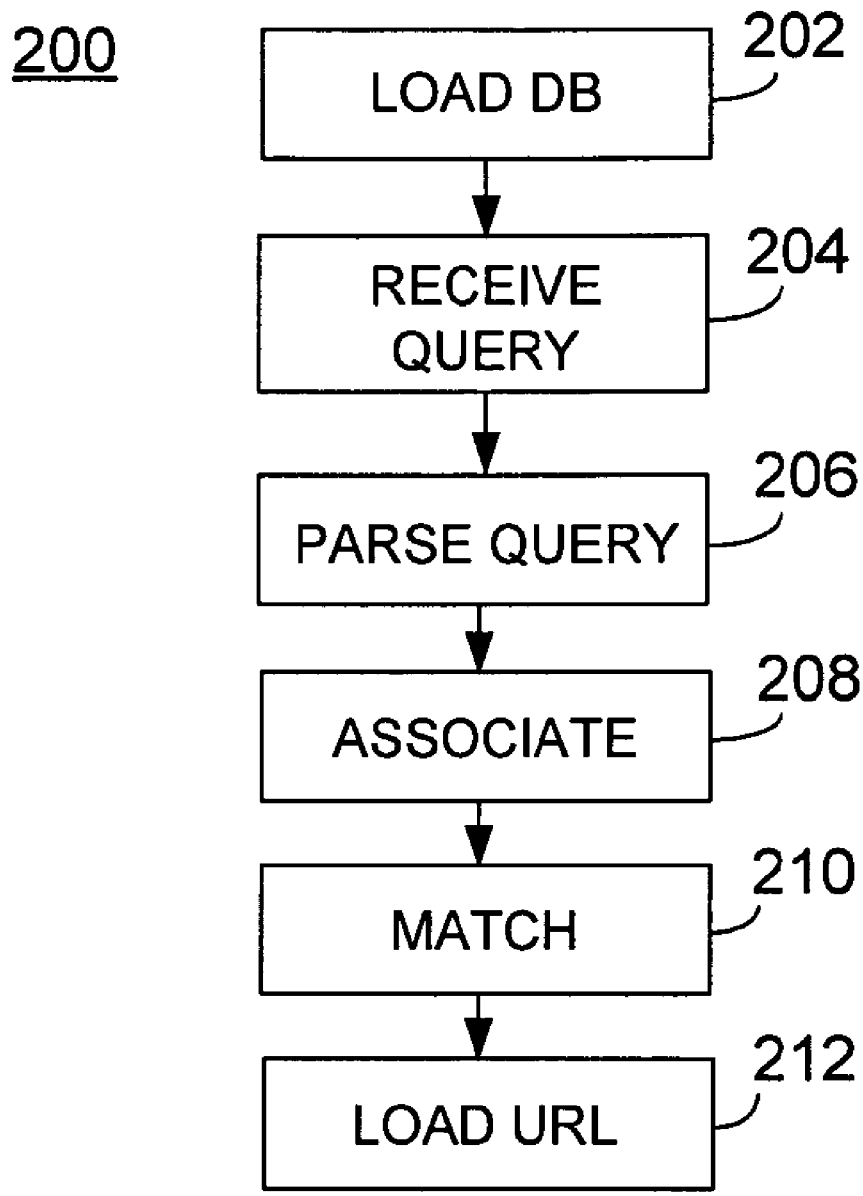
FIG. 3 is a flow diagram of a query process.

Referring to FIG. 3, a query process 200 includes loading (202) a database containing pages of content with mapped concepts. The process 200 receives (204) a user query and parses (206) the user query in conjunction with grammar rules. The process 200 associates (208) the parsed user query with a concept. The process 200 matches (210) the user query concept with a concept/URL pair and loads (212) the associated concept as directed by the URL.

Accordingly, other embodiments are within the scope of the following claims.

What is claimed is:

1. A computer program comprising instructions stored in a memory that, when executed by a processor, cause the processor to:

perform a pre-processing stage by parsing documents contained in a collection with a grammar in order to identify one or more concepts contained therein, and assign concept labels to the documents contained in the collection according to the grammar; and perform a post-processing stage to apply the grammar to a query to convert the query to one or more concepts and map the concepts to the concept labels that match the concepts, wherein the query is normalized, the normalized query is parsed and converted into fragments according to a feature lexicon, the fragments are inflated by selectively merging state information provided by a session service with a meaning representation for the query, and the inflated fragments are converted into a meaning resolution through a meaning resolution stage that determines whether there is a valid interpretation of a key-value grouping of each of the fragments, such that the meaning resolved fragments are associated with the concepts.

2. The computer program of claim 1 further comprising instructions for causing the processor to:

generate a list of the map.

3. A computer program comprising instructions stored in a memory that, when executed by a processor, cause the processor to:

perform a pre-processing stage by parsing documents contained in a collection using grammar rules in order to identify one or more concepts contained therein, and assign concept labels to the documents contained in a collection according to the grammar rules;

receive a query;

perform a post-processing stage to apply the grammar rules to a query to convert the query to one or more concepts and map the concepts to the concept labels that match the concepts, wherein the query is normalized, the normalized query is parsed and converted into fragments according to a feature lexicon, the fragments are inflated by selectively merging state information provided by a session service with a meaning representation for the query, and the inflated fragments are converted into a meaning resolution through a meaning resolution stage that determines whether there is a valid interpretation of a key-value grouping of each of the fragments, such that the meaning resolved fragments are associated with the concepts.

4. The computer program of claim 3 further comprising instructions for causing the processor to:

generate a list of the mapped query concepts; and display the list to a user on an input/output device.

* * * * *